United States Patent
Hezkiahu (10) Patent No.: US 12,503,193 B1
(45) Date of Patent: Dec. 23, 2025

(54) MOTORCYCLE THROTTLE HOUSING AND CAM ASSEMBLY

(71) Applicant: Ran Hezkiahu, Scottsdale, AZ (US)

(72) Inventor: Ran Hezkiahu, Scottsdale, AZ (US)

( * ) Notice: Subject to any disclaimer, the term of this patent is extended or adjusted under 35 U.S.C. 154(b) by 0 days.

(21) Appl. No.: 18/961,505

(22) Filed: Nov. 27, 2024

(51) Int. Cl.
- *B62K 23/02* (2006.01)
- *B62K 23/04* (2006.01)
- *F02D 11/02* (2006.01)
- *F16C 1/10* (2006.01)
- *F16C 1/18* (2006.01)

(52) U.S. Cl.
CPC .............. *B62K 23/04* (2013.01); *F02D 11/02* (2013.01); *F16C 1/18* (2013.01)

(58) Field of Classification Search
CPC ......... B62K 23/02; B62K 23/04; F02D 11/02; F16C 1/18
See application file for complete search history.

(56) References Cited

U.S. PATENT DOCUMENTS

| | | | | |
|---|---|---|---|---|
| 10,473,143 B2 * | 11/2019 | Basiliere | .................... | F16C 1/12 |
| 10,668,974 B2 * | 6/2020 | Erdmann | ............... | B62K 23/04 |
| 11,052,963 B2 * | 7/2021 | Erdmann | ................. | F16C 19/06 |
| 2003/0150287 A1 * | 8/2003 | Lev-Ran | ................. | B62K 23/06 |
| | | | | 74/488 |
| 2004/0216550 A1 * | 11/2004 | Fallak | .................... | B62M 25/08 |
| | | | | 74/551.9 |
| 2006/0053936 A1 * | 3/2006 | Wancket | ................... | F16C 1/18 |
| | | | | 74/501.6 |
| 2008/0257102 A1 * | 10/2008 | Packer | ................... | B62K 21/26 |
| | | | | 74/551.9 |
| 2012/0061368 A1 * | 3/2012 | Frigerio | ................ | B62K 23/04 |
| | | | | 219/204 |

FOREIGN PATENT DOCUMENTS

| | | | | | |
|---|---|---|---|---|---|
| CN | 118289126 A | * | 7/2004 | ............. | B62K 23/04 |
| CN | 113428281 A | * | 9/2021 | ............... | G01B 7/30 |
| CN | 117508434 A | * | 2/2024 | ............. | B62K 23/04 |
| DE | 202016002101 U1 | * | 6/2016 | ................ | F16C 1/18 |
| EP | 1225123 A1 | * | 7/2002 | ............. | B62K 23/04 |
| GB | 2548794 A | * | 10/2017 | ............. | B62K 21/26 |

* cited by examiner

*Primary Examiner* — Adam D Rogers (74) *Attorney, Agent, or Firm* — Dekel Patent Ltd.; David Klein (57) ABSTRACT

A throttle housing and cam assembly includes a cam mountable on an end of a throttle tube, an outer bearing flange and a cam head. The cam head has one or more cable receiving apertures and a cable groove for receiving a throttle cable. A bearing is mounted on the outer bearing flange. A throttle housing is formed with a bearing groove and a cam groove. An outer stationary portion of the bearing is received firmly in the bearing groove and the cam is free to move in the cam groove.

10 Claims, 7 Drawing Sheets

MOTORCYCLE THROTTLE HOUSING AND CAM ASSEMBLY

FIELD OF THE INVENTION

The present invention relates generally to throttle tube accessories for motorcycles, including dirt or motocross motorcycles or other vehicles that use throttle tubes, and particularly to a throttle housing and cam assembly with a bearing between the cam and the throttle housing.

BACKGROUND OF THE INVENTION

It is well known in the art that a throttle tube is mounted on the end of a handlebar of a motorcycle. The throttle tube rotationally twists over the outer surface of the handlebar about the central axis of the handlebar. The throttle tube is connected by a cable to the engine throttle. Rotation of the throttle tube controls the power provided by the engine to power the motorcycle.

In a typical motorcycle, a throttle housing is located next to the throttle tube. The throttle housing houses the end of the throttle tube where the cam is mounted. The throttle housing is typically made of two parts that are fastened together over the cam at the end of the throttle tube. The cam is a type of pulley mechanism, to which a throttle cable is coupled. The throttle cable transmits the torque of twisting the throttle tube to the engine throttle. The throttle housing keeps everything secure and aligned, ensuring smooth operation when the rider twists the throttle. As the throttle tube rotates, the cam also rotates, pulling or releasing the throttle cable. The cam slides inside the throttle housing. The cam allows for a smooth and precise pull on the cable as the rider twists the throttle. It helps modulate how quickly or slowly the cable moves, affecting the engine's responsiveness to throttle input.

Friction occurs at several key interfaces, affecting throttle smoothness and control. First, friction between the throttle tube and the throttle housing can cause the throttle to feel sticky or stiff, making it harder to twist. Cleaning and lubricating these parts help maintain smooth operation. Second, since the throttle tube rotates around the handlebar, friction between the throttle tube and the handlebar can result in a sluggish or jerky throttle response. Dirt buildup or lack of lubrication can increase friction, making the throttle harder to twist. Proper cleaning and lubrication ensure the throttle moves freely. Third, friction inside the throttle cable sheath can lead to stiff or delayed throttle response and even throttle sticking. Regularly lubricating the cable reduces drag and prevents premature wear. The fourth friction source is the cam and cable connection. Excessive friction at the cam mechanism can result in jerky or inconsistent throttle control. Lubricating the cam connection ensures smooth and precise throttle movement. There can also be friction between the cam and the throttle housing.

Prior art throttle tubes exist that have a radial bearing at the free end of the throttle tube (the free end is the end opposite to the cable end, which is the end that has the cam and cable connection). The cable end has a nylon bushing. U.S. Pat. No. 10,668,974 and 11,052,963 describe a throttle tube that has a built-in radial bearing at the cable end of the throttle tube. The bearing on the cable side is located inside the cam or inside the throttle tube.

Accordingly, in the prior art, the nylon bushing or bearing is located inside the throttle tube or inside the cam. A problem with this construction is that since it is difficult and no recommended for the end user (the rider) to install the bearing inside the throttle tube or cam, such prior art throttle tubes are manufactured and sold with the cam and bearing as part of the throttle tube. Since different cams must be used with different motorcycle models, this means the prior art throttle tube must be custom made to fit each brand of motorcycle, which increases the cost. Another problem is that such a prior throttle tube will only work with a rubber grip; the throttle tube cannot be used with the commonly used over-molded grip.

SUMMARY

The present invention seeks to provide a novel throttle housing and cam assembly, as described in detail below. Unlike the prior art, in the present invention, a bearing is not inside the cam or inside the throttle tube; instead, in the present invention, the bearing is located outside the cam, between the cam and the throttle housing. The cam and throttle housing have a different construction than the prior art. This construction allows the throttle housing and cam assembly to be provided separately from the throttle tube, so that the novel throttle housing and cam can be used with any existing throttle tube which allows for the cam to be mounted on it, without any need for custom fitting. The assembly of the invention can be used with both rubber grips and over-molded grips.

The invention is cost-effective, allowing for the production of multiple cams without the need to manufacture multiple throttle tubes. The new throttle housing design is versatile because it can be used with a regular cam (without a bearing) or with the new cam (with a bearing).

There is provided in accordance with a non-limiting embodiment of the invention a throttle housing and cam assembly including a cam mountable on an end of a throttle tube and including an outer bearing flange and a cam head, the cam head having one or more cable receiving apertures and a cable groove for receiving a throttle cable, a bearing mounted on the outer bearing flange, and a throttle housing formed with a bearing groove and a cam groove, wherein an outer stationary portion of the bearing is received firmly in the bearing groove and the cam is free to move in the cam groove. This construction creates a concentric assembly between the cam and the throttle housing.

In accordance with a non-limiting embodiment of the invention when the cam is mounted on the throttle tube, the outer bearing flange does not face towards the throttle tube.

In accordance with a non-limiting embodiment of the invention the outer bearing flange is axially offset from the cable groove.

In accordance with a non-limiting embodiment of the invention the throttle housing includes two throttle housing halves fastened to each other by one or more fasteners.

In accordance with a non-limiting embodiment of the invention the throttle housing includes a cable receiving portion for receiving therein one or more cables connected to the cam.

In accordance with a non-limiting embodiment of the invention the throttle housing includes a handlebar mounting portion for mounting on a handlebar.

In accordance with a non-limiting embodiment of the invention there is provided a method for mounting a throttle tube on a handlebar, including providing a cam that includes an outer bearing flange and a cam head, the cam head having one or more cable receiving apertures and a cable groove for receiving a throttle cable, providing a bearing mounted or mountable on the outer bearing flange, providing a throttle housing formed with a bearing groove and a cam groove, instructing to mount the cam and the bearing attached thereto on an end of the throttle tube which is mounted on the handlebar, and instructing to mount the cam and the bearing attached thereto in the throttle housing, wherein an outer stationary portion of the bearing is received firmly in the bearing groove and the cam is free to move in the cam groove.

In accordance with a non-limiting embodiment of the invention when the cam is mounted on the throttle tube, the outer bearing flange does not face towards the throttle tube.

In accordance with a non-limiting embodiment of the invention the outer bearing flange is axially offset from the cable groove.

In accordance with a non-limiting embodiment of the invention the throttle tube is sold separately from the cam and the throttle housing.

BRIEF DESCRIPTION OF DRAWINGS

The present invention will be understood and appreciated more fully from the following detailed description, taken in conjunction with the drawings in which.

DETAILED DESCRIPTION

Figure 1A:
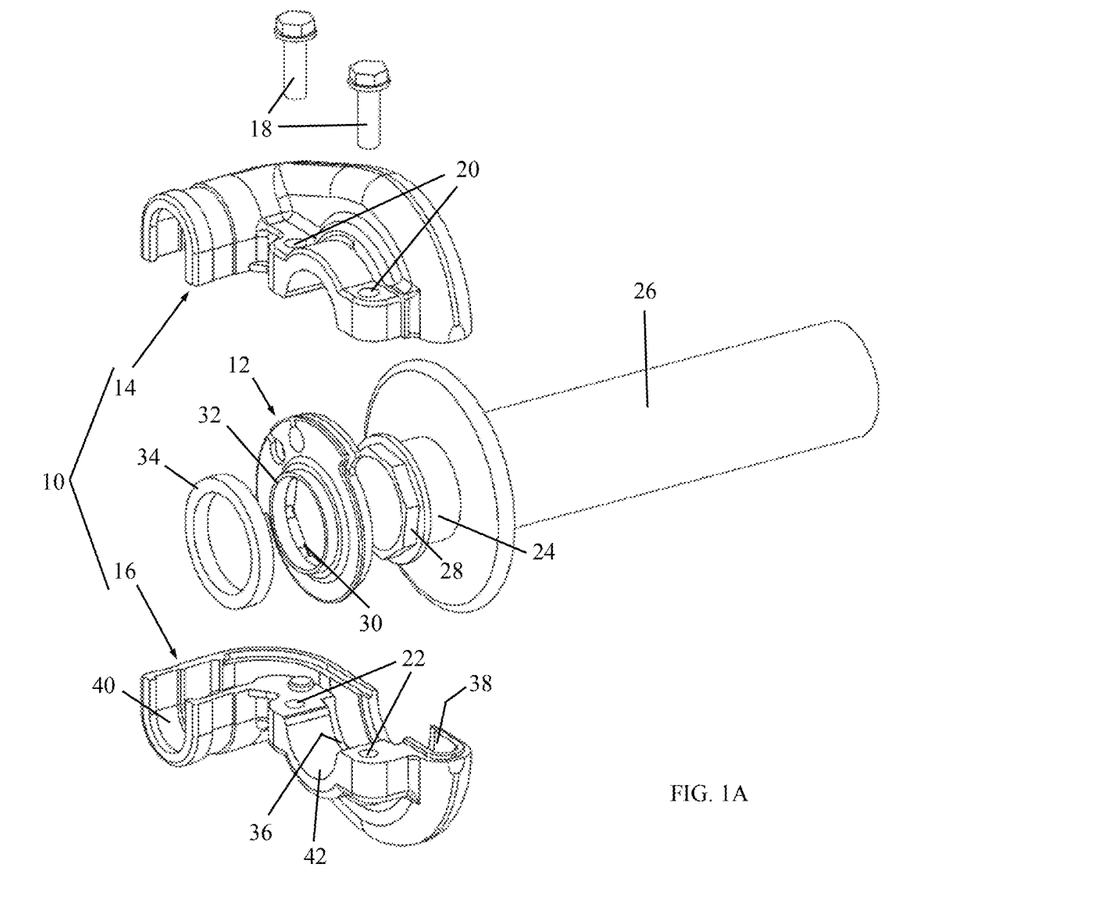
FIGS. 1A and 1B are simplified perspective, exploded-view illustrations of a throttle housing and cam assembly, in accordance with a non-limiting embodiment of the invention.
Figure 1B:
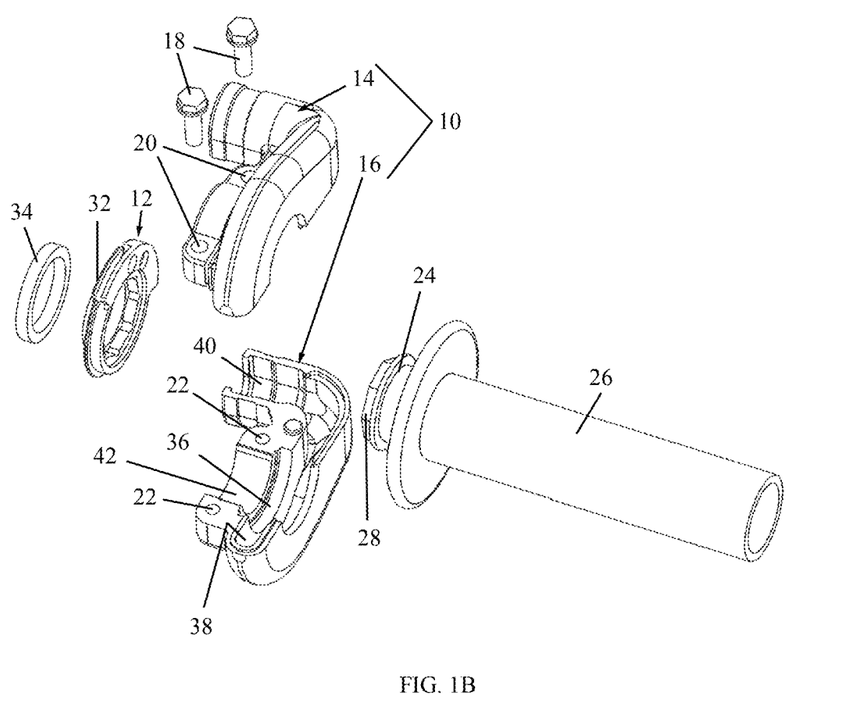

Reference is now made to FIGS. 1A and 1B, which illustrate an assembly of a throttle housing 10 and a cam 12, in accordance with a non-limiting embodiment of the invention.

The throttle housing 10 may be constructed of two throttle housing halves 14 and 16, which may be fastened to each other by means of one or more fasteners 18, such as screws that pass through holes 20 in throttle housing half 14 and mate with threaded holes 22 (or nuts) in throttle housing half 16.

Cam 12 mounts on an end (called the cable end 24) of a throttle tube 26. Throttle tube 26 can be a plastic throttle tube, lock-on throttle tube, or aluminum throttle tube, or any other kind of throttle tube available on the market, in which the cable end 24 is configured to mount cams thereon. As is well known in the art, many throttle tubes have keying arrangements, such as a male hexagonal flange 28 for accepting a corresponding female hexagonal opening 30 on the cam 12 (opening 30 being shown more clearly in FIG. 2B). Such a hexagonal keying arrangement is known, for example, in the ODI V2 system snap-on throttle cams. Other keying arrangements include, without limitation, a lug that is received in a groove, as in the G2 ERGONOMIC snap-on throttle cams.

In accordance with a non-limiting embodiment of the invention, cam 12 includes an outer bearing flange 32 ("outer" in the sense that it is on the side of the cam that does not face the throttle tube). A bearing 34 is mounted on outer bearing flange 32. Bearing 34 may be, without limitation, a rolling element bearing assembly, which includes an outer raceway, an inner raceway, a cage and rolling elements, such as a ball bearing, or cylindrical, spherical, tapered or needle roller bearings.

Each throttle housing half may include a bearing groove 36 (seen best in FIG. 1B) and a cam groove 38. The outer stationary portion (such as the outer raceway) of the bearing 34 may fit firmly in bearing groove 36, whereas cam 12 is free to move and glide in cam groove 38. Each throttle housing half may include a cable receiving portion 40 for receiving therein the cables that are connected to the cam. Each throttle housing half may include a handlebar mounting portion 42 for mounting on the handlebar.

Figure 2A:
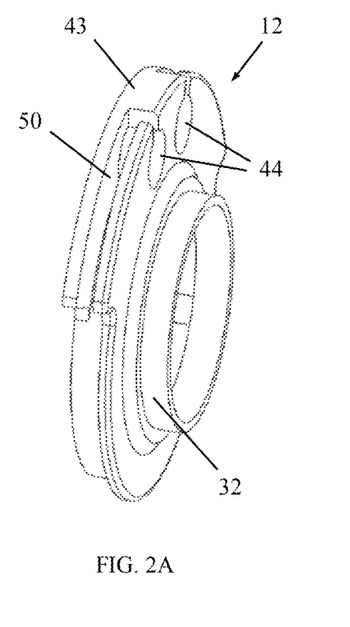
FIGS. 2A and 2B are simplified perspective illustrations of the cam, in accordance with a non-limiting embodiment of the invention.
Figure 2B:
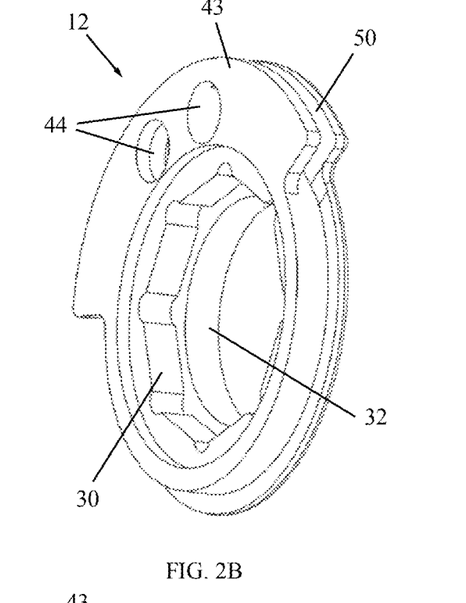
Figure 6:
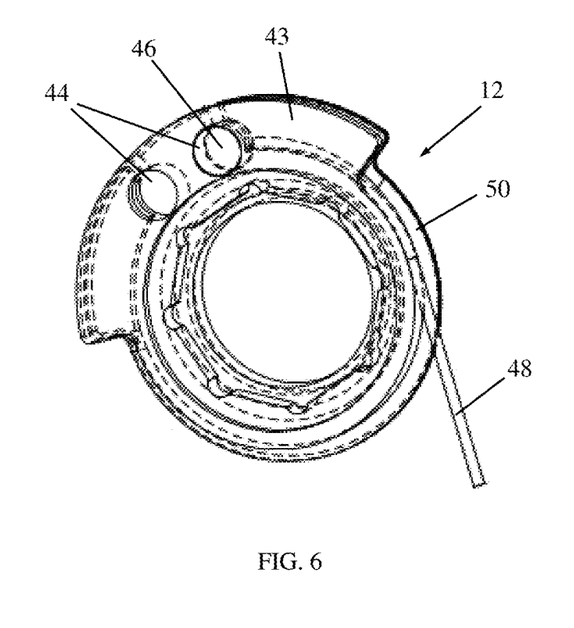
FIG. 6 is a simplified illustration of a throttle cable installed in the cam of the invention.

Reference is now made to FIGS. 2A and 2B, which illustrate the cam 12, in accordance with a non-limiting embodiment of the invention. Cam 12 may include a cam head 43 that has one or more cable receiving apertures 44, which as seen in FIG. 6, receive a cable button 46 of a throttle cable 48. The cable 48 fits in a cable groove 50 formed on the cam head 43.

Figure 3:
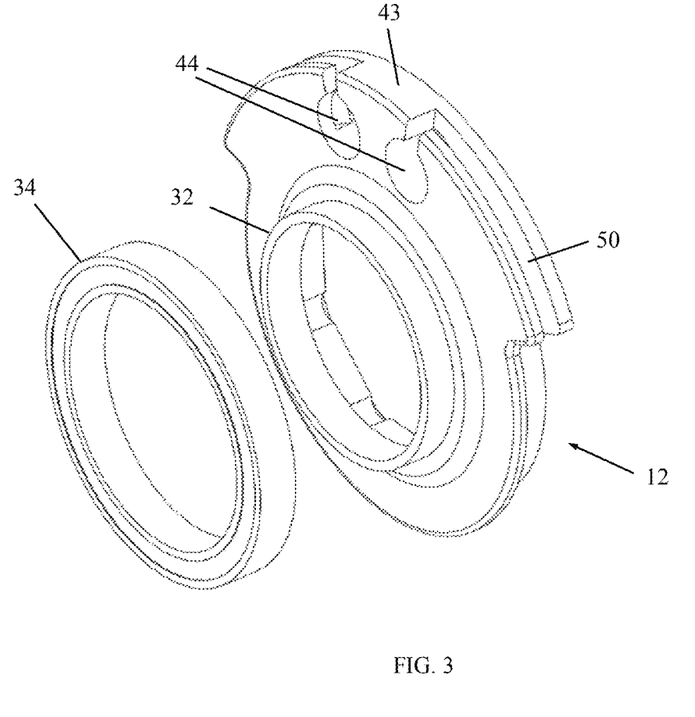
FIG. 3 is a simplified perspective illustration of the cam with a bearing about to be mounted thereon, in accordance with a non-limiting embodiment of the invention.

FIG. 3 illustrates cam 12 with bearing 34 about to be mounted on outer bearing flange 32. It is clearly seen that bearing 34 is axially offset from the cable groove 50 and the cable receiving apertures 44 of cam 12. Accordingly, bearing 34 is axially offset from the cable (not shown here but seen in FIG. 6). This is different from the prior art in which the bearing is mounted inside the cam and is not axially offset from the cable.

Figure 4A:
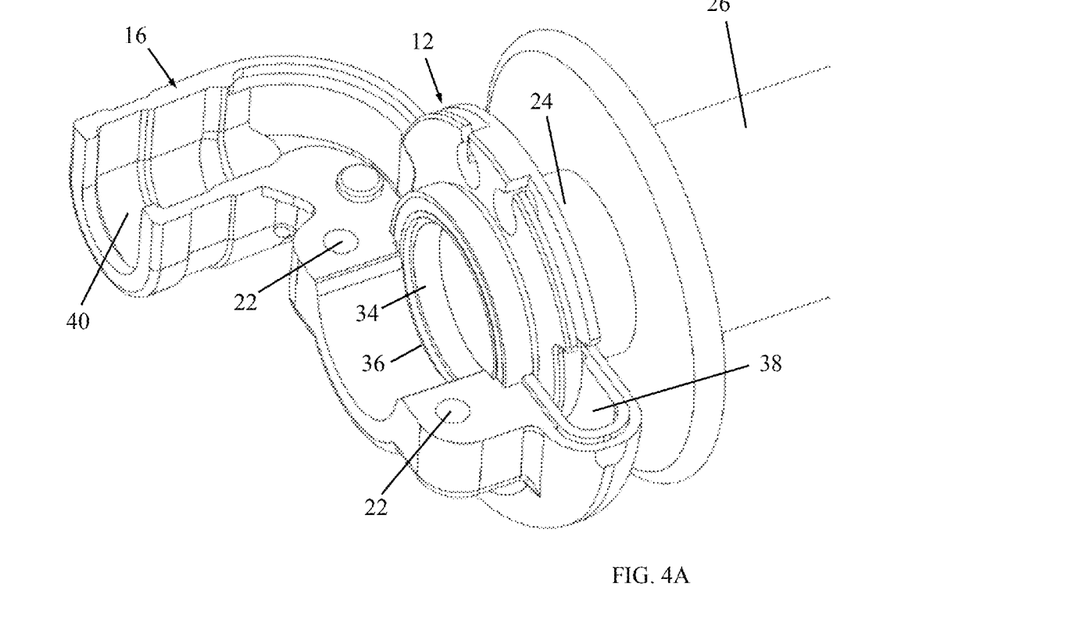
FIGS. 4A, 4B and 4C are simplified perspective, top-view and end-view illustrations, respectively, of the cam and bearing mounted on the cable end of the throttle tube, and the cam and bearing mounted in one of the throttle housing halves, in accordance with a non-limiting embodiment of the invention.
Figure 4B:
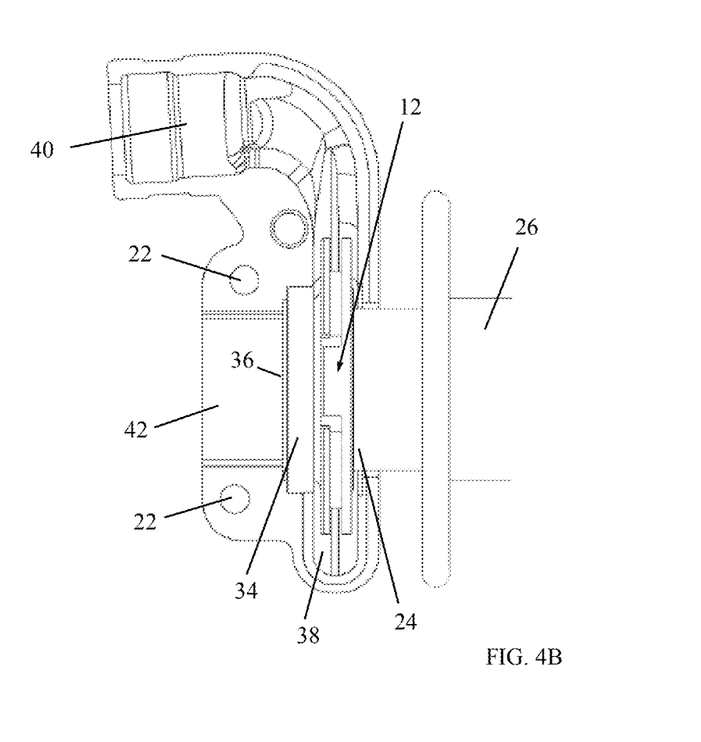
Figure 4C:
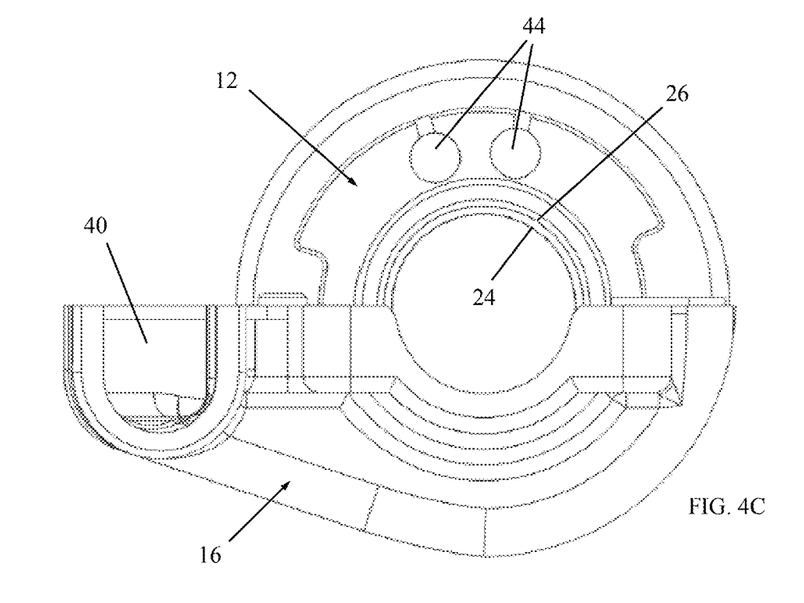

FIGS. 4A, 4B and 4C illustrate cam 12 and bearing 34 mounted on the cable end 24 of the throttle tube 26. The cam 12 and bearing 34 are shown mounted in the throttle housing half 16.

Figure 5A:
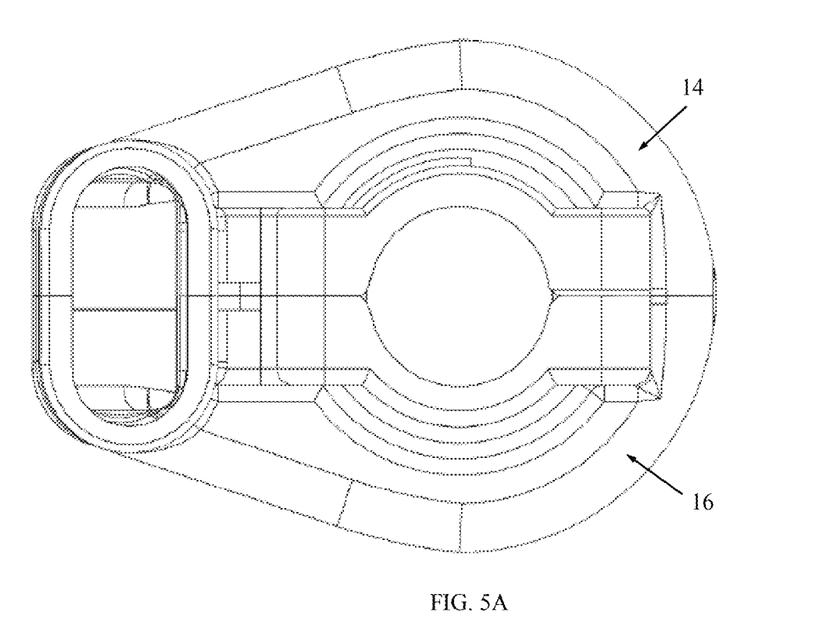
FIGS. 5A and 5B are simplified end-view and perspective illustrations, respectively, of the finished throttle housing and cam assembly, with the cam and bearing mounted in both throttle housing halves, in accordance with a non-limiting embodiment of the invention.
Figure 5B:
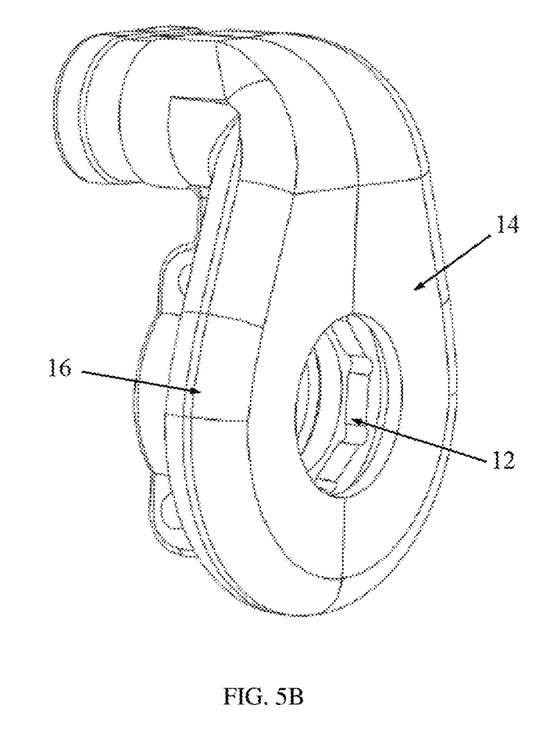

FIGS. 5A and 5B illustrate the finished throttle housing and cam assembly, with the cam and bearing mounted in both throttle housing halves 14 and 16.

In use, the rider grips and twists the throttle tube. As the throttle tube rotates, the cam attached to the throttle tube also rotates inside the throttle housing. The bearing supports the rotation of the cam with very little friction. The cam provides a mechanical advantage, ensuring smooth operation and proper tension on the throttle cable. The rotating cam pulls the throttle cable, which is connected to the engine throttle valve. The movement of the throttle cable opens or closes the throttle valve, regulating air intake, and thus controls the acceleration or deceleration of the motorcycle.

Figure 7A:
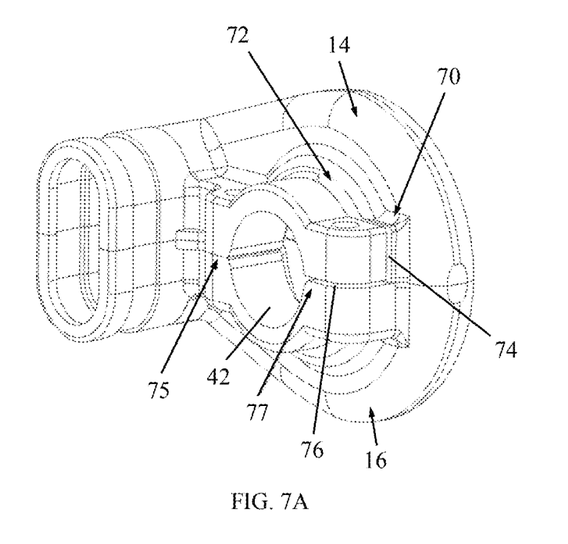
FIGS. 7A and 7B are simplified pictorial illustrations of structure that enables the throttle housing halves to be fastened over the bearing and at the same time be fastened over the handlebar without damaging or deforming the bearing or the handlebar.
Figure 7B:
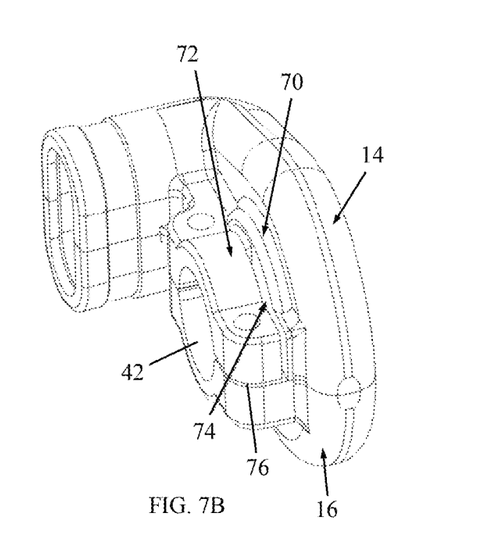

It is noted that throttle housing halves 14 and 16 are fastened over the bearing and the handlebars. However, in general, tightening parts over two different rigid surfaces is not possible without damaging or deforming one of the rigid surfaces. Reference is now made to FIGS. 7A and 7B, which illustrate structure that solves this problem and enables the throttle housing halves 14 and 16 to be fastened over the bearing 34 and at the same time be fastened over the handlebar without damaging or deforming the bearing or the handlebar.

The area where the throttle housing halves 14 and 16 clamp on the bearing is shown in FIGS. 7A and 7B and is called bearing clamp area 70; it overlies bearing groove 36 of FIG. 1B. The area where the throttle housing halves 14 and 16 clamp on the handlebar is shown in FIGS. 7A and 7B and is called handlebar clamping area 72; it overlies handlebar mounting portion 42. As seen in FIG. 7B, one of the throttle housing halves, which in the illustrated embodiment is throttle housing half 14, is formed with a gap 74 between bearing clamp area 70 and handlebar clamping area 72. As seen in FIG. 7A, when throttle housing half 14 starts to clamp down on the handlebar (not shown) at handlebar clamping area 72, a first portion 75 of throttle housing half 14 abuts against throttle housing half 16 on one side of the handlebar mounting portion 42 before a second portion 77 of throttle housing half 14 abuts against throttle housing half 16 on the opposite side of the handlebar mounting portion 42 due to a gap 76 formed at the second portion 77 of throttle housing half 14 or 16. The throttle housing halves 14 and 16 clamp on the bearing before gap 76 is closed; gap 76 closes tightly only after the throttle housing halves 14 and 16 clamp on the handlebar. The gap 74 between bearing clamp area 70 and handlebar clamping area 72 ensures that the extra clamping force needed to fasten the throttle housing halves on the handlebar is not transferred to the bearing, and instead causes slight local deformation in the throttle housing. This local deformation does not damage the throttle housing halves because gap 74 provides stress relief and makes the parts resilient to such deformation.

What is claimed is:

1. A throttle housing and cam assembly comprising:
   a cam mountable on an end of a throttle tube and comprising an outer bearing flange and a cam head, said cam head having one or more cable receiving apertures and a cable groove for receiving a throttle cable;
   a bearing mounted on said outer bearing flange; and
   a throttle housing formed with a bearing groove and a cam groove, wherein an outer stationary portion of said bearing is received in said bearing groove and said cam is free to move in said cam groove.

2. The throttle housing and cam assembly according to claim 1, wherein when said cam is mounted on the throttle tube, said outer bearing flange does not face towards the throttle tube.

3. The throttle housing and cam assembly according to claim 1, wherein said outer bearing flange is axially offset from said cable groove.

4. The throttle housing and cam assembly according to claim 1, wherein said throttle housing comprises two throttle housing halves fastened to each other by one or more fasteners.

5. The throttle housing and cam assembly according to claim 1, wherein said throttle housing comprises a cable receiving portion for receiving therein said throttle cable.

6. The throttle housing and cam assembly according to claim 1, wherein said throttle housing comprises a handlebar mounting portion for mounting on a handlebar.

7. The throttle housing and cam assembly according to claim 6, wherein said throttle housing comprises two throttle housing halves fastened to each other by one or more fasteners, and an area where said throttle housing halves clamp on said bearing is called a bearing clamp area that overlies said bearing groove, and an area where said throttle housing halves clamp on the handlebar is called a handlebar clamping area that overlies said handlebar mounting portion, and one of said throttle housing halves is formed with a gap between said bearing clamp area and said handlebar clamping area, and a first portion of one of said throttle housing halves abuts against the other throttle housing half on one side of said handlebar mounting portion before a second portion of said one of said throttle housing halves abuts against said other throttle housing half on an opposite side of said handlebar mounting portion due to another gap located at said second portion.

8. A method for mounting a cam to a throttle tube, comprising:
   providing a cam that comprises an outer bearing flange and a cam head, said cam head having one or more cable receiving apertures and a cable groove for receiving a throttle cable;
   providing a bearing mounted or mountable on said outer bearing flange;
   providing a throttle housing formed with a bearing groove and a cam groove;
   mounting said cam and said bearing attached thereto on an end of the throttle tube; and
   mounting said cam and said bearing attached thereto in said throttle housing, wherein an outer stationary portion of said bearing is received in said bearing groove and said cam is free to move in said cam groove.

9. The method according to claim 8, wherein when said cam is mounted on the throttle tube, said outer bearing flange does not face towards the throttle tube.

10. The method according to claim 8, wherein said outer bearing flange is axially offset from said cable groove.

* * * * *